(12) United States Patent
Haga et al.

(10) Patent No.: US 10,468,926 B2
(45) Date of Patent: Nov. 5, 2019

(54) MOTOR

(71) Applicant: NIDEC CORPORATION, Minami-ku, Kyoto (JP)

(72) Inventors: Hidehiro Haga, Kyoto (JP); Masato Aono, Kyoto (JP); Takashi Hattori, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

(21) Appl. No.: 15/283,895

(22) Filed: Oct. 3, 2016

(65) Prior Publication Data

US 2017/0033625 A1 Feb. 2, 2017

Related U.S. Application Data

(63) Continuation of application No. 14/002,592, filed as application No. PCT/JP2012/008218 on Dec. 21, 2012, now Pat. No. 9,496,761.

(30) Foreign Application Priority Data

Dec. 26, 2011 (JP) .................................. 2011-283475

(51) Int. Cl.
*H02K 1/28* (2006.01)
*H02K 1/27* (2006.01)

(52) U.S. Cl.
CPC ............... *H02K 1/28* (2013.01); *H02K 1/274* (2013.01); *H02K 1/278* (2013.01)

(58) Field of Classification Search
CPC .......... H02K 1/28; H02K 1/274; H02K 1/278; H02K 1/2726; H02K 1/2706; H02K 1/27
(Continued)

(56) References Cited

U.S. PATENT DOCUMENTS 5,452,663 A 9/1995 Berdut
6,177,750 B1 * 1/2001 Tompkin .................. H02K 1/28
310/211

(Continued)

FOREIGN PATENT DOCUMENTS

JP 06178477 A 6/1994
JP H10126985 A 5/1998
(Continued)

OTHER PUBLICATIONS

English translation of JP 2004120916; Apr. 2004; Hiroyuki at al.*
(Continued)

*Primary Examiner* — Julio C. Gonzalez
*Assistant Examiner* — Ahmed Elnakib
(74) *Attorney, Agent, or Firm* — Cantor Colburn LLP

(57) ABSTRACT

Described herein is a motor including a stationary section and a rotating section. The stationary section includes a stator core having a plurality of teeth, and a coil constituted by a conducting wire wound around each of the plurality of teeth. The rotating section has a plurality of magnets arranged in a circumferential direction, a rotor core which is in contact with the magnets, a magnet holder which is fixed to the rotor core, and an annular plate. The lower surface of the annular plate faces the upper surface of the magnets. Further, the annular plate is fixed to the rotor core and the magnet holder. Employing this structure enables the annular plate to further prevent an upward position shift of the magnets.

2 Claims, 12 Drawing Sheets

(58) Field of Classification Search
USPC ......... 310/214, 215, 156.01, 156.68, 156.72, 310/156.12; 29/598
See application file for complete search history.

(56) References Cited

U.S. PATENT DOCUMENTS

| | | | |
|---|---|---|---|
| 6,208,054 B1 | 3/2001 | Tajima et al. | |
| 6,429,566 B1* | 8/2002 | Kuwahara | H02K 1/2773 310/156.56 |
| 7,687,957 B2 | 3/2010 | Ochiai et al. | |
| 7,939,985 B2* | 5/2011 | Yamada | H02K 1/276 310/156.53 |
| 8,324,782 B2* | 12/2012 | Minami | H02K 21/044 310/263 |
| 2002/0162939 A1 | 11/2002 | Heidrich | |
| 2008/0093945 A1 | 4/2008 | Gruenhagen | |
| 2009/0001839 A1 | 1/2009 | Masayuki et al. | |
| 2009/0224621 A1 | 9/2009 | Okubo et al. | |
| 2009/0261677 A1 | 10/2009 | Ishikawa et al. | |
| 2010/0026123 A1 | 2/2010 | Feng et al. | |
| 2010/0244605 A1* | 9/2010 | Nakano | B62D 5/0403 310/156.01 |
| 2011/0291498 A1 | 12/2011 | Sakata et al. | |
| 2013/0009494 A1 | 1/2013 | Oguma | |
| 2013/0257184 A1 | 10/2013 | Haga et al. | |
| 2013/0257211 A1 | 10/2013 | Haga et al. | |
| 2015/0210196 A1 | 7/2015 | Yamamoto et al. | |

FOREIGN PATENT DOCUMENTS

| | | | |
|---|---|---|---|
| JP | 2000228855 A | | 8/2000 |
| JP | 2001095183 A | | 4/2001 |
| JP | 2001169485 A | | 6/2001 |
| JP | 2001231198 A | | 8/2001 |
| JP | 2004023944 A | | 1/2004 |
| JP | 2004120916 A | | 4/2004 |
| JP | 2007288977 A | | 11/2007 |
| JP | 2008072790 A | | 3/2008 |
| JP | 2009081938 | * | 4/2009 |
| JP | 2009112089 A | | 5/2009 |
| JP | 2009261191 A | | 11/2009 |
| JP | 2010136578 A | | 6/2010 |
| JP | 2010141993 A | | 6/2010 |
| WO | 2006008964 A1 | | 1/2006 |
| WO | 2008059736 A1 | | 5/2008 |
| WO | 2010133496 A1 | | 11/2010 |
| WO | 2011108733 A1 | | 9/2011 |

OTHER PUBLICATIONS

International Search Report for International Application No. PCT/JP2012/008218; dated Mar. 26, 2013.
U.S. First Action Interview-Office Action corresponding to U.S. Appl. No. 14/002,592; dated Dec. 31, 2015.
U.S. Non-Final Office Action corresponding to U.S. Appl. No. 14/002,592; dated Jul. 16, 2015.
Written Opinion of the International Searching Authority for International Application No. PCT/JP2012/008218; dated Mar. 26, 2013.

* cited by examiner

MOTOR

CROSS REFERENCE TO RELATED APPLICATIONS

The present application is a continuation application of U.S. patent application Ser. No. 14/002,592, filed on Aug. 30, 2013, the entire contents of which are incorporated herein by reference and priority to which is hereby claimed. Application Ser. No. 14/002,592 is the U.S. National stage of International Application No. PCT/JP2012/008218, filed on Dec. 21, 2012. Priority under 35 U.S.C. § 119(a) and 35 U.S.C. § 365(b) is claimed from Japanese Application No. 2011-283475, Dec. 26, 2011, the disclosures of which are also incorporated herein by reference.

TECHNICAL FIELD

The present invention relates to a motor.

BACKGROUND ART

In the past, an inner-rotor-type motor which rotates a rotor unit having magnets in an area inner than a coil has been known. For example, in International Patent Application Publication WO2006/008964A, a brushless motor including a stator and a rotor disposed inside the stator is described.

The rotor described in International Patent Application Publication WO2006/008964A has a rotor shaft, a rotor core, a magnet holder, and six rotor magnets (Paragraphs 0026 and 0027). Further, the magnet holder described in the Publication has a holder base and a holder arm. The holder base is fixed to the rotor shaft. The holder arm is formed to axially protrude from the holder base (Paragraph 0027). Further, the rotor magnet described in the Publication is press-fitted into a magnet accommodating section (Paragraph 0028). The magnet accommodating section is defined by a magnet holding piece of the holder arm and the outer peripheral surface of the rotor core.

CITATION LIST

Patent Literature

[PTL 1]
International Patent Application Publication WO2006/008964A

SUMMARY OF INVENTION

Technical Problem

However, in the structure described in International Patent Application Publication WO2006/008964A, both end portions in a circumferential direction of the rotor magnet are in contact with a main body portion of the magnet holder (Paragraph 0030, FIG. 6). For this reason, in a case where some of the rotor magnets are formed larger than a design dimension, the magnet holder is pushed by the rotor magnet, thereby being deformed. As a result, it becomes difficult to press-fit another rotor magnet into the magnet accommodating section. Further, even if all the rotor magnets could be press-fitted into the magnet accommodating section, adjacent rotor magnets become to push each other with the main body portion of the magnet holder interposed therebetween. In this way, there is a concern that the position of each rotor magnet may be shifted in the circumferential direction.

An object of the present invention is to provide a structure in which in an inner rotor type motor, even if some of the magnets are formed larger than a design dimension, an obstacle in disposing of another magnet does not easily occur.

Means for Solving the Problem

A motor according to an exemplary first aspect of the invention of this application includes a stationary section, and a rotating section which rotates around a central axis extending vertically. The stationary section includes a stator core and a coil. The stator core has a plurality of teeth. The coil is constituted by a conducting wire wound around each of the teeth. The rotating section includes a plurality of magnets, a rotor core, and a magnet holder. The plurality of magnets are arranged in a circumferential direction in an area radially inner than the coil. The rotor core comes into contact with the magnets. The magnet holder is fixed to the rotor core. The annular plate has a lower surface which faces an upper surface of the magnets. The annular plate is fixed to the rotor core and the magnet holder.

Advantage of Invention

According to the exemplary first aspect of the invention of this application, even if some of the magnets are formed larger than a design dimension, deformation of the columnar portion by the magnet does not easily occur. Therefore, an obstacle in disposing of another magnet also does not easily occur.

EXAMPLES

Hereinafter, exemplary embodiments of the invention will be described with reference to the drawings. In addition, in the specification of this application, a direction along the central axis of a motor will be referred to as an "axial direction". Further, a direction orthogonal to the central axis of the motor will be referred to as a "radial direction". Further, a direction along a circular arc centered on the central axis of the motor will be referred to as a "circumferential direction". Further, in the specification of this application, the shape or the positional relationship of each section will be described with one side in the axial direction set to be the "top" and the other side set to be the "bottom". However, this is for defining the top and the bottom only for the convenience of explanation and is not intended to limit the direction in use of a motor according to the invention.

1. First Embodiment

Figure 1:
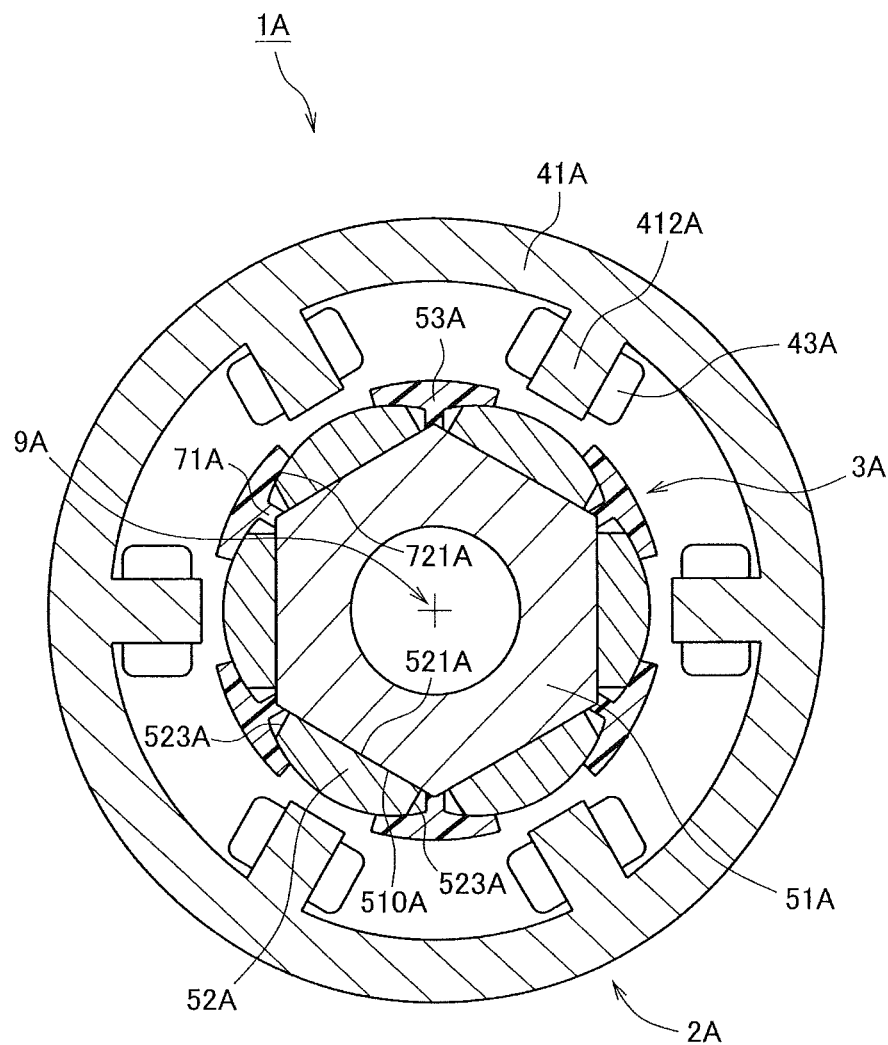
FIG. 1 is a transverse cross-sectional view of a motor according to a first embodiment.

FIG. 1 is a transverse cross-sectional view of a motor 1A according to a first embodiment of the invention. As shown in FIG. 1, the motor 1A includes a stationary section 2A and a rotating section 3A. The rotating section 3A rotates around a central axis 9A.

The stationary section 2A includes a stator core 41A and a coil 43A. The stator core 41A has a plurality of teeth 412A. The coil 43A is constituted by a conducting wire wound around each of the teeth 412A.

The rotating section 3A includes a rotor core 51A, a plurality of magnets 52A, and a magnet holder 53A. The plurality of magnets 52A are arranged in the circumferential direction in an area inner than the coil 43A. The rotor core 51A has an outer peripheral surface 510A which comes into contact with a radially inner surface 521A of each of the magnets 52A. The magnets 52A are held between the rotor core 51A and the magnet holder 53A.

Each of the magnets 52A has circumferential end faces 523A at both end portions in the circumferential direction. The magnet holder 53A has a columnar portion 71A and a wall surface 721A. The columnar portion 71A axially extends between adjacent magnets 52A among the plurality of magnets 52A. The wall surface 721A spreads in the circumferential direction from the columnar portion 71A.

The wall surface 721A is in contact with the surface arranged radially outer than the circumferential end face 523A of the magnet 52A. Further, the circumferential end face 523A on at least one side of the magnet 52A faces the columnar portion 71A with a gap interposed therebetween in the circumferential direction. For this reason, even if some of the magnets 52A are formed larger than a design dimension, deformation of the columnar portion 71A by the magnet 52A does not easily occur. Therefore, an obstacle in disposing of another magnet 52A also does not easily occur.

2. Second Embodiment

<2-1. Overall Structure of Motor>

Subsequently, a second embodiment of the invention will be described.

Figure 2:
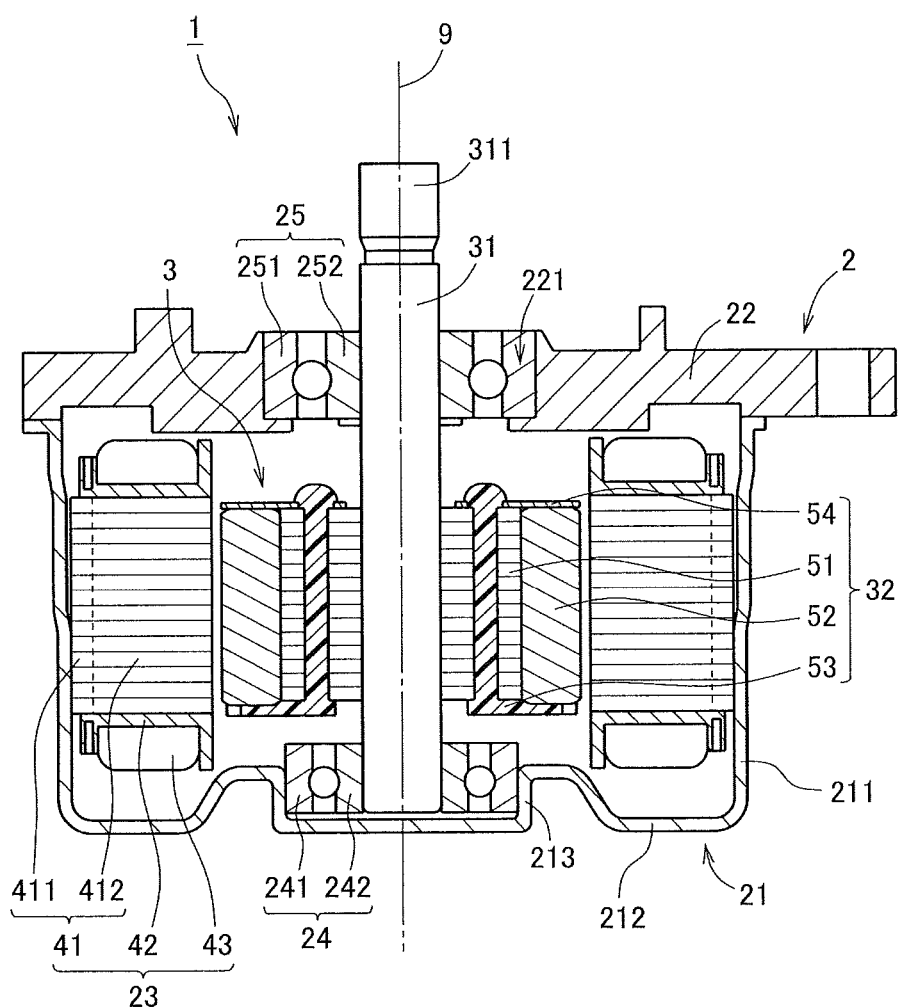
FIG. 2 is a vertical cross-sectional view of a motor according to a second embodiment.

FIG. 2 is a vertical cross-sectional view of a motor 1 according to the second embodiment. The motor 1 according to this embodiment is mounted on an automobile and used to generate the driving force of a steering gear. As shown in FIG. 2, the motor 1 includes a stationary section 2 and a rotating section 3. The rotating section 3 is supported rotatably with respect to the stationary section 2.

The stationary section 2 in this embodiment includes a housing 21, a lid 22, a stator unit 23, a lower bearing section 24, and an upper bearing section 25.

The housing 21 has a side wall 211 of a substantially cylindrical shape and a bottom 212 blocking a lower portion of the side wall. The lid 22 covers an opening of an upper portion of the housing 21. The stator unit 23 and a rotor unit 32 (described later) are accommodated in an internal space surrounded by the housing 21 and the lid 22. A concave portion 213 for disposing the lower bearing section 24 therein is provided at the center of the bottom 212 of the housing 21. Further, a circular hole 221 for disposing the upper bearing section 25 therein is provided at the center of the lid 22.

The stator unit 23 is an armature which generates magnetic flux in response to a driving current. The stator unit 23 includes a stator core 41, an insulator 42, and a coil 43. The stator core 41 is formed of, for example, a laminated steel sheet which is formed by laminating a plurality of electromagnetic steel sheets in the axial direction. The stator core 41 includes an annular core back 411 and a plurality of teeth 412. Each of the plurality of teeth 412 protrudes radially inward from the core back 411. The core back 411 is fixed to the inner circumferential surface of the side wall 211 of the housing 21. The respective teeth 412 are arranged at substantially regular intervals in the circumferential direction.

The insulator 42 is made of resin that is of insulating material. Further, the insulator 42 is mounted on each of the teeth 412. The upper surface, the lower surface, and both end faces in the circumferential direction of each of the teeth 412 are covered by the insulator 42. A conducting wire constituting the coil 43 is wound around each of the teeth 412 with the insulator 42 interposed therebetween. The insulator 42 is interposed between each of the teeth 412 and the coil 43. With this structure, electrical short-circuit of each of the teeth 412 and the coil 43 is prevented. In addition, in place of the insulator 42, insulation painting may also be performed on the surfaces of each of the teeth 412.

The lower bearing section 24 is disposed between the housing 21 and a shaft 31 of the rotating section 3. Further, the upper bearing section 25 is disposed between the lid 22 and the shaft 31 of the rotating section 3. In each of the lower bearing section 24 and the upper bearing section 25 in this embodiment, a ball bearing in which an outer race and an inner race are relatively rotated through spherical bodies is used. However, in place of the ball bearing, another type of bearing such as a sliding bearing or a fluid bearing may also be used.

An outer race 241 of the lower bearing section 24 is disposed in the concave portion 213 of the housing 21, thereby being fixed to the housing 21. Further, an outer race 251 of the upper bearing section 25 is disposed in the circular hole 221 of the lid 22, thereby being fixed to the lid 22. On the other hand, inner races 242 and 252 of the lower bearing section 24 and the upper bearing section 25 are fixed to the shaft 31. In this way, the shaft 31 is supported rotatably with respect to the housing 21 and the lid 22.

The rotating section 3 in this embodiment includes the shaft 31 and the rotor unit 32.

The shaft 31 is a columnar member extending along a central axis 9. The shaft 31 rotates around the central axis 9 while being supported on the lower bearing section 24 and the upper bearing section 25 described above. Further, as shown in FIG. 2, the shaft 31 has a head portion 311 protruding further upward than the lid 22. The head portion 311 is connected to a steering gear of an automobile through a power transmission mechanism such as gears.

The rotor unit 32 is disposed radially inner than the stator unit 23 and rotates along with the shaft 31. The rotor unit 32 in this embodiment includes a rotor core 51, a plurality of magnets 52, a magnet holder 53, and an annular plate 54. The detailed structure of each section of the rotor unit 32 will be described later.

In the motor 1, as a driving current is applied to the coil 43 of the stationary section 2, radial magnetic flux is generated in the plurality of teeth 412 of the stator core 41. Then, circumferential torque is generated by the action of the magnetic flux between the teeth 412 and the magnets 52. As a result, the rotating section 3 rotates around the central axis 9 with respect to the stationary section 2. As the rotating section 3 rotates, a driving force is transmitted to the steering gear connected to the shaft 31.

<2-2. Structure of Rotor Unit>

Figure 3:
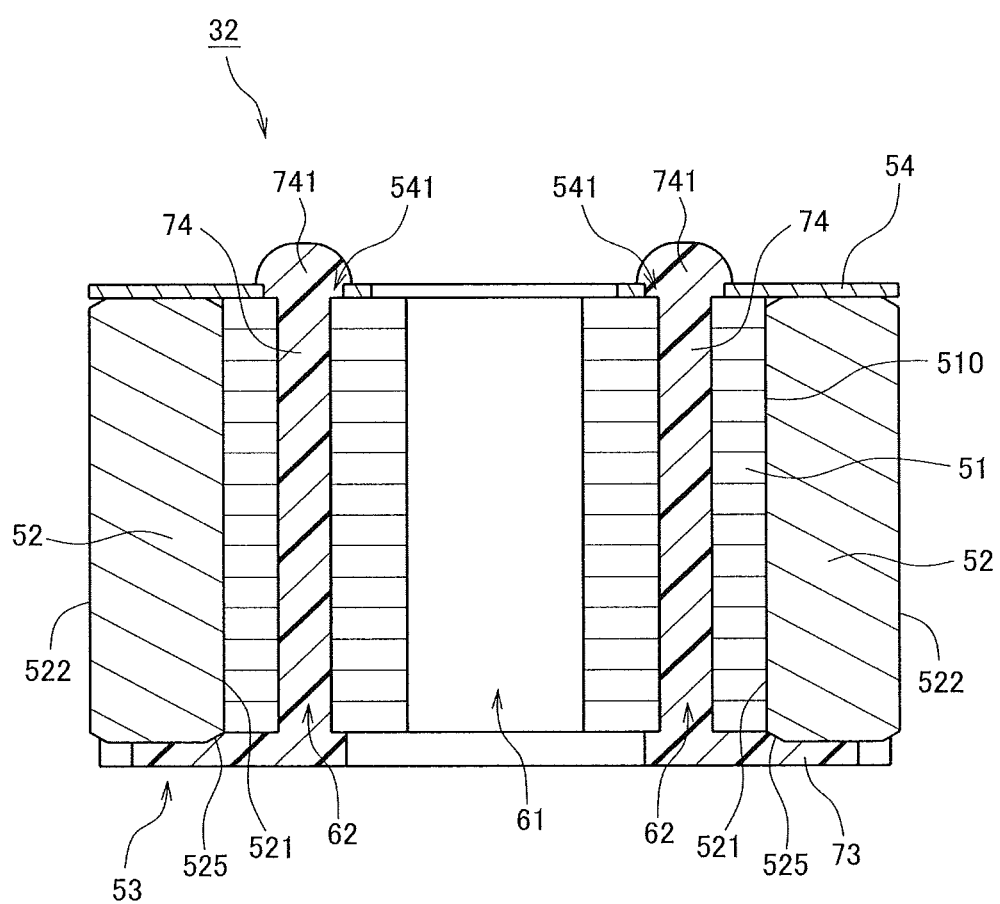
FIG. 3 is a vertical cross-sectional view of a rotor unit according to the second embodiment.
Figure 4:
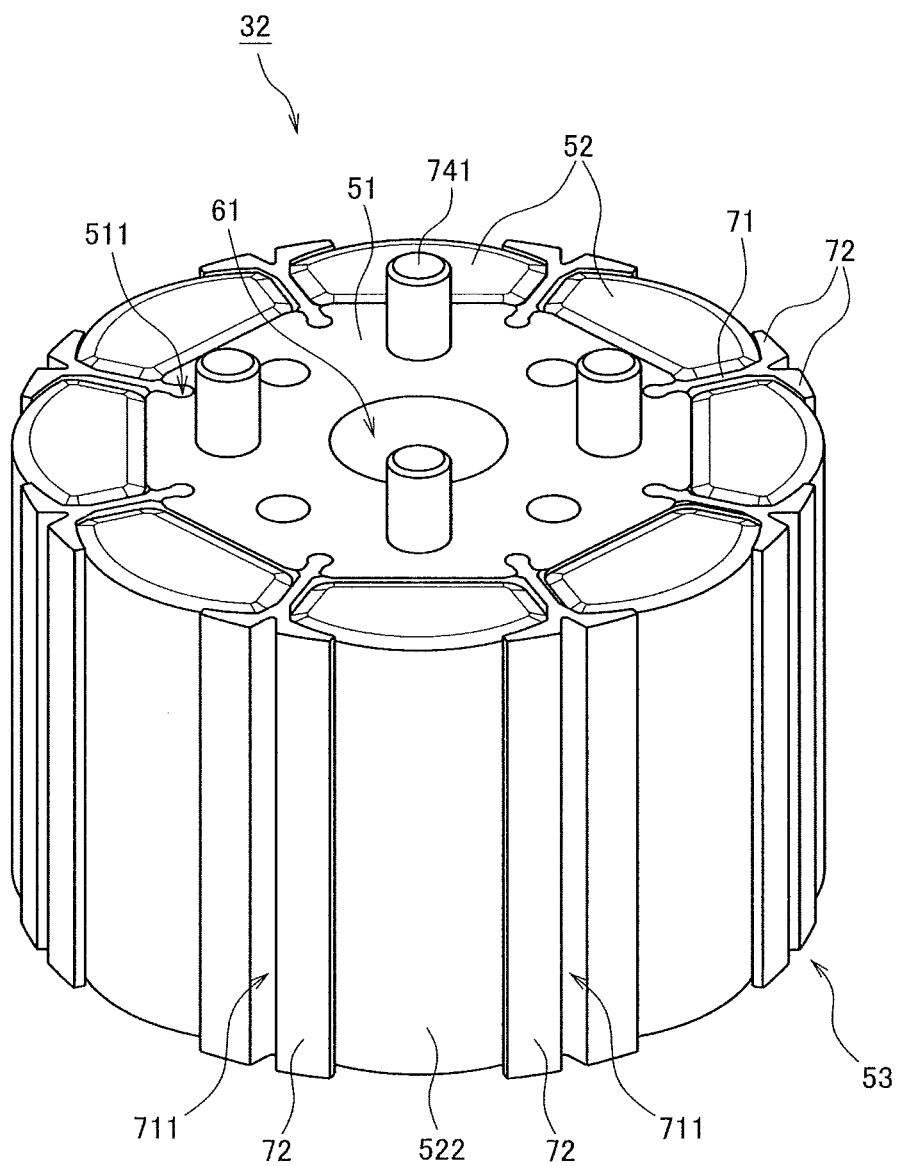
FIG. 4 is a perspective view of the rotor unit according to the second embodiment.
Figure 5:
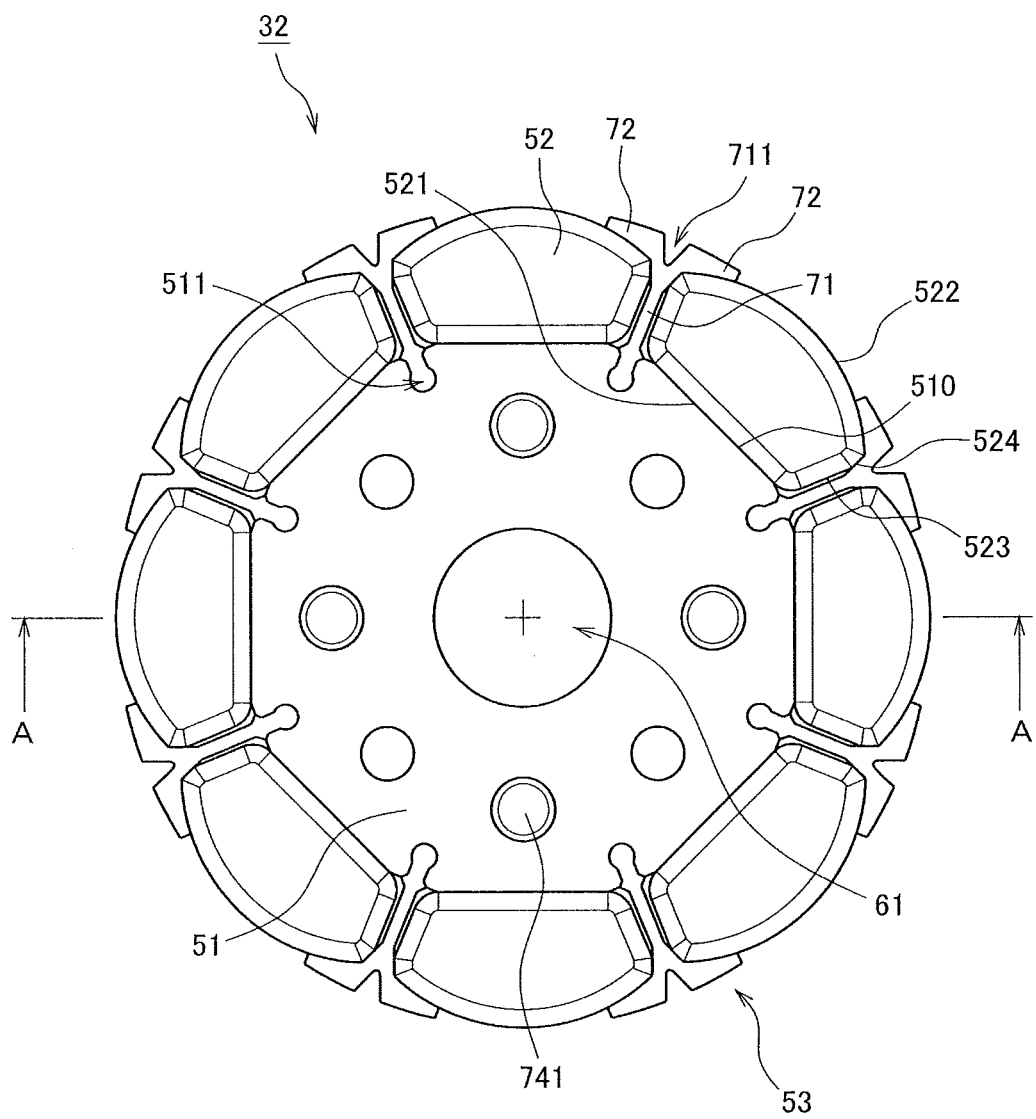
FIG. 5 is a top view of the rotor unit according to the second embodiment.
Figure 6:
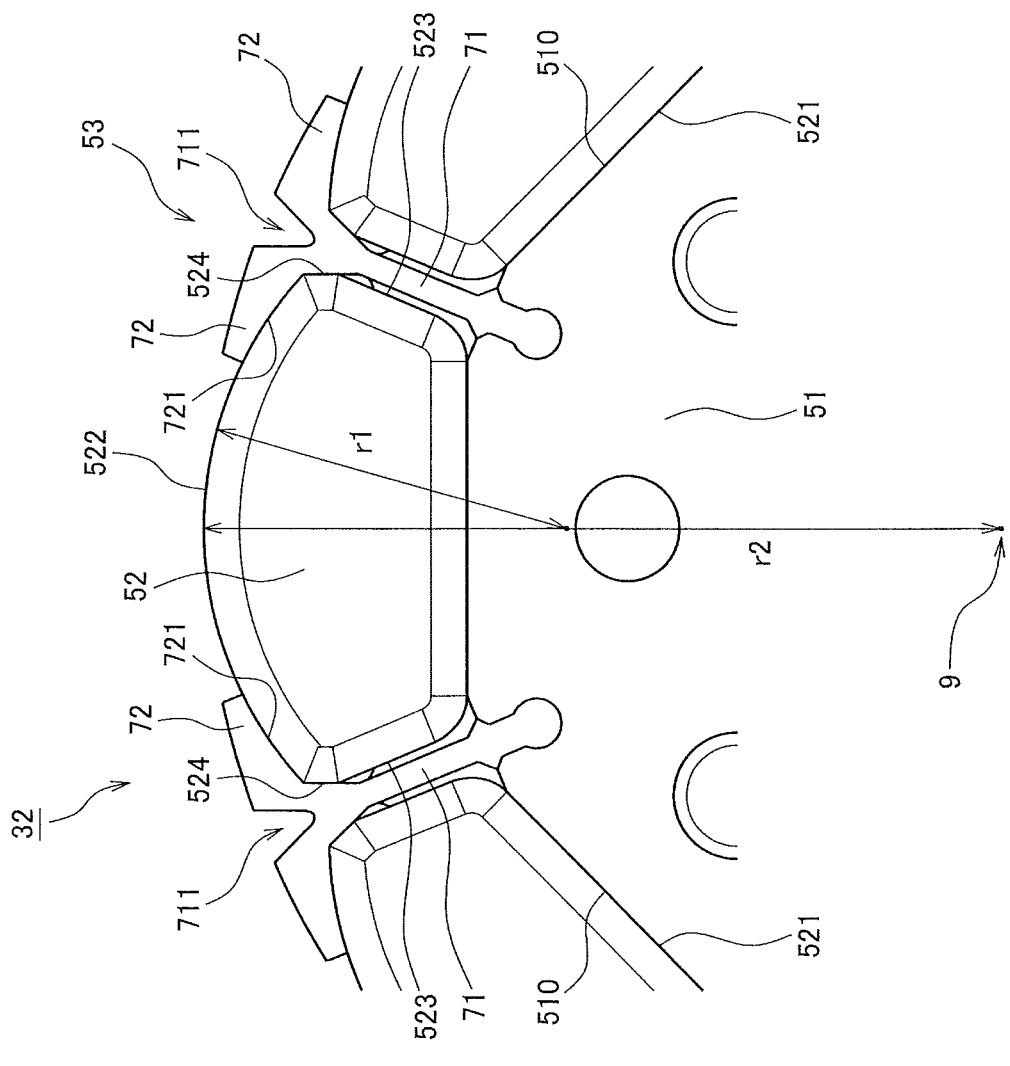
FIG. 6 is a partial top view of the rotor unit according to the second embodiment.
Figure 7:
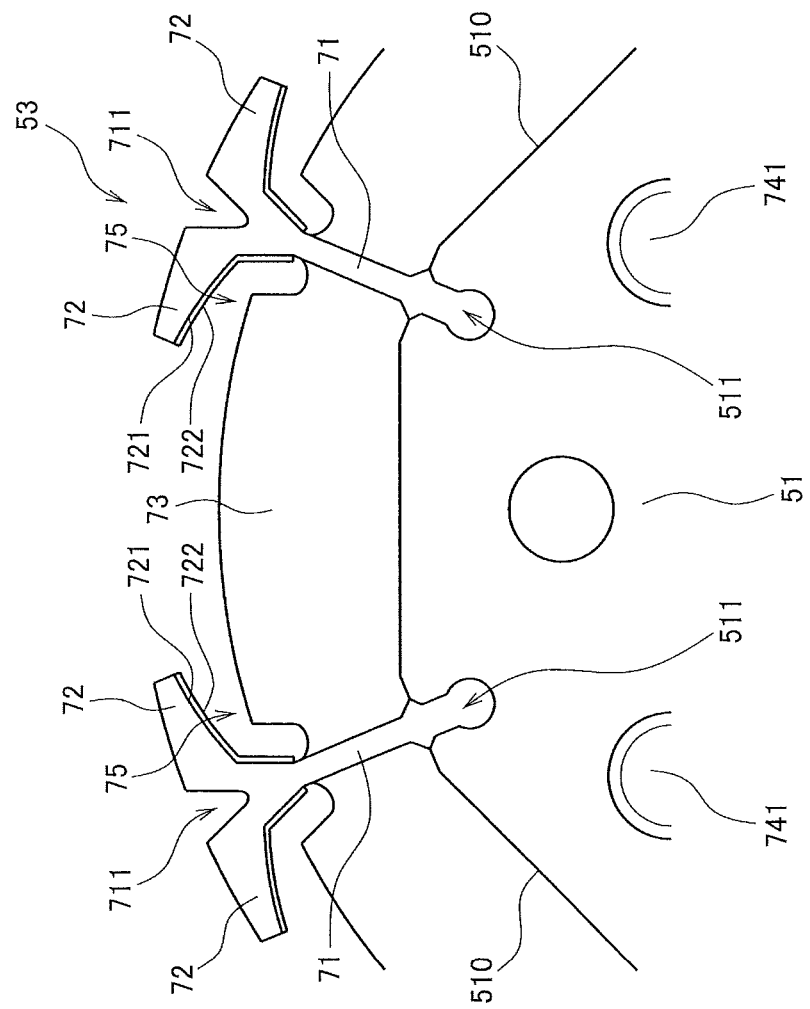
FIG. 7 is a partial top view of a rotor core and a magnet holder according to the second embodiment.

Subsequently, the more detailed structure of the rotor unit 32 will be described. FIG. 3 is a vertical cross-sectional view of the rotor unit 32. FIG. 4 is a perspective view of the rotor unit 32. FIG. 5 is a top view of the rotor unit 32. FIG. 6 is a partial top view of the rotor unit 32. FIG. 7 is a partial top view of the rotor core 51 and the magnet holder 53. In addition, FIG. 3 corresponds to an A-A cross-section of FIG. 5. Further, in FIGS. 4 to 6, a state before mounting of the annular plate 54 is shown.

The rotor core 51 is a tubular member surrounding the central axis 9. The rotor core 51 in this embodiment is formed of a laminated steel sheet which is formed by laminating a plurality of electromagnetic steel sheets in the axial direction. The rotor core 51 has an outer peripheral surface 510 of a substantially regular polygonal column shape. Further, a plurality of cutouts 511 recessed radially inward is provided in the outer peripheral surface 510 of the rotor core 51. Each of the cutouts 511 axially extends at each of boundary portions between the plural planar surfaces constituting the outer peripheral surface 510 of the rotor core 51.

A first through-hole 61 into which the shaft 31 is inserted is provided at the center of the rotor core 51. Further, a plurality of second through-holes 62, inside each of which a boss 74 (described later) is formed, is provided around the first through-hole 61. The first through-hole 61 and the plurality of second through-holes 62 axially penetrate the rotor core 51.

The plurality of magnets 52 are arranged in the circumferential direction in an area radially inner than the stator unit 23. A radially inner surface 521 of each magnet 52 is in contact with the outer peripheral surface 510 of the rotor core 51. Further, a radially outer surface 522 of each magnet 52 becomes a magnetic pole face which radially faces the stator unit 23. The plurality of magnets 52 are disposed at substantially regular intervals in the circumferential direction in such a manner that an N-pole magnetic pole face and an S-pole magnetic pole face are alternately arranged.

Further, the magnet 52 has a chamfered portion 525 at a peripheral portion of the lower surface thereof. In particular, in a case where the magnet 52 is made of a sintered material, it is preferable to provide the chamfered portion 525 in order to prevent chipping of the magnet 52. As shown in FIG. 3, in this embodiment, the chamfered portion 525 is located lower than the lower surface of the rotor core 51. Therefore, the outer peripheral surface 510 in the vicinity of a lower end portion of the rotor core 51 is in contact with the radially inner surface 521 of the magnet 52 almost without a gap. In this way, a decrease in magnetic characteristics due to the chamfered portion 525 is suppressed.

In addition, also on the upper end portion side of the magnet 52, similarly, a chamfered portion may be provided to protrude further upward than the upper surface of the rotor core 51. By doing so, a decrease in magnetic characteristics due to the chamfered portion can be further suppressed.

The magnet holder 53 is a member made of resin, which holds the magnets 52. The magnet holder 53 in this embodiment has a plurality of columnar portions 71, a plurality of wall portions 72, a bottom portion 73, and a plurality of bosses 74. When manufacturing the rotor unit 32, in a state where the rotor core 51 is inserted into the inside of a mold in advance, molten resin is injected into the inside of the mold. That is, insert molding is performed. In this way, the magnet holder 53 is molded and also the rotor core 51 and the magnet holder 53 are fixed to each other.

The plurality of columnar portions 71 are arranged at substantially regular intervals in the circumferential direction. Each of the columnar portions 71 axially extends between adjacent magnets 52 among the plurality of magnets 52. A radially inner end edge portion of the columnar portion 71 is held in the cutout 511 of the rotor core 51. Further, a lower end portion of the columnar portion 71 is connected to the bottom portion 73.

The wall portion 72 spreads from a radially outer end edge portion of the columnar portion 71 to both sides in the circumferential direction. The magnet 52 is press-fitted between the outer peripheral surface 510 of the rotor core 51 and a wall surface 721 on the radial inner side of the wall portion 72. As a result, the radially inner surface 521 of the magnet 52 is in contact with the outer peripheral surface 510 of the rotor core 51. Further, the radially outer surface 522 of the magnet 52 is in contact with the wall surface 721 on the radial inner side of the wall portion 72. In this way, the magnet 52 is held.

In this embodiment, the radial thickness of the wall portion 72 increases as approaching the columnar portion 71. With such a shape, during insert molding, molten resin easily flows from the columnar portion 71 to the wall portion 72. Therefore, the vicinity of a leading end portion of the wall portion 72 is accurately molded. As a result, retention of the magnet 52 by the wall surface 721 is more stable.

As shown in FIGS. 5 and 6, the radially inner surface 521 of the magnet 52 is made to be a substantially planar surface orthogonal to the radial direction. Further, the radially outer surface of the magnet 52 is made to be a convex curved surface 522 having a substantially circular arc shape in a plan view. Further, the magnet 52 has a circumferential end face 523 at each of both end portions in the circumferential direction. In addition, the magnet 52 has an inclined surface 524 connecting a circumferential end side of the convex curved surface 522 and a radially outer end side of the circumferential end face 523. The inclined surface 524 spreads so as to approach the center in the circumferential direction of the magnet 52 as heading radially outward from the radially outer end of the circumferential end face 523.

In this embodiment, the wall surface 721 of the magnet holder 53 is in continuous contact with both of the convex curved surface 522 and the inclined surface 524 of the magnet 52. That is, the wall surface 721 of the magnet holder 53 is in contact with the surface arranged radially outer than the circumferential end face 523 of the magnet 52. When driving the motor 1, a centrifugal force is applied to the magnet 52. However, wall surface 721 prevents the magnet 52 from escaping radially outward.

Further, as shown in FIG. 6, the radius of curvature r1 of the convex curved surface 522 is smaller than a distance r2 between the convex curved surface 522 and the central axis 9. Further, the inclined surface 524 is inclined with respect to the circumferential direction. For this reason, if the convex curved surface 522 and the inclined surface 524 come into contact with the wall surface 721, drag component in the circumferential direction is generated in a contact portion of these surfaces. As a result, a position shift in the circumferential direction of the magnet 52 is also suppressed.

Further, at each of both end portions in the circumferential direction of the magnet 52, the circumferential end face 523 and the columnar portion 71 of the magnet holder 53 face each other with a gap interposed therebetween in the circumferential direction. For this reason, even if some of the magnets 52 are formed larger than a design dimension, deformation of the columnar portion 71 by the magnet 52 does not easily occur. Therefore, an obstacle in press-fitting of another magnet 52 also does not easily occur. Further, adjacent magnets' 52 pushing each other with the columnar portion 71 interposed therebetween can be prevented. As a result, a position shift in the circumferential direction of each magnet 52 is further suppressed. That is, according to the structure in this embodiment, the plurality of magnets 52 can be accurately disposed in the circumferential direction.

The bottom portion 73 is an annular portion which is located below the rotor core 51 and the magnets 52. The columnar portions 71 are connected to each other through the bottom portion 73. The lower surface of the rotor core 51 is in contact with the upper surface of the bottom portion 73. Further, the lower surface of the magnet 52 is in contact with the upper surface of the bottom portion 73 or axially faces the upper surface of the bottom portion 73 with a small gap interposed therebetween.

Further, as shown in FIG. 7, a void 75 cut out toward the columnar portion 71 is provided in a boundary portion between a lower end portion of the wall portion 72 and the bottom portion 73. The void 75 axially penetrates the bottom portion 73 on the lower side of the wall surface 721 in which the magnet 52 is press-fitted. Even if the wall surface 721 is ground when press-fitting the magnet 52 and thus dust is produced, the dust is discharged downward of the bottom portion 73 through the void 75. In this way, dust being caught between the lower surface of the magnet 52 and the upper surface of the bottom portion 73 can be suppressed. Therefore, a position shift in the axial direction of the magnet 52 due to dust can be suppressed.

Further, in this embodiment, due to the formation of the void 75, the flexibility of the wall portion 72 is improved. That is, compared to a case where there is no void 75, the wall portion 72 of the magnet holder 53 is easily bent radially outward. In this way, it becomes easy to press-fit the magnet 52 until it comes into contact with the bottom portion 73. As a result, the magnet 52 can be more stably held between the rotor core 51 and the wall portion 72. Further, by forming the void 75, the amount of resin which is used in the magnet holder 53 can be reduced, and thus the manufacturing cost of the motor 1 can be further reduced.

Further, in this embodiment, a grove 711 extending in the axial direction is provided on the radially outer surface of the columnar portion 71 of the magnet holder 53. In this way, the flexibility of the wall portion 72 is further improved. If the flexibility of the wall portion 72 is improved, it becomes easier to press-fit the magnet 52 until it comes into contact with the bottom portion 73. Further, since stress that is applied to the wall portion 72 is dispersed, occurrence of cracks in the wall portion 72 due to press-fitting of the magnet 52 is also suppressed.

Figure 8:
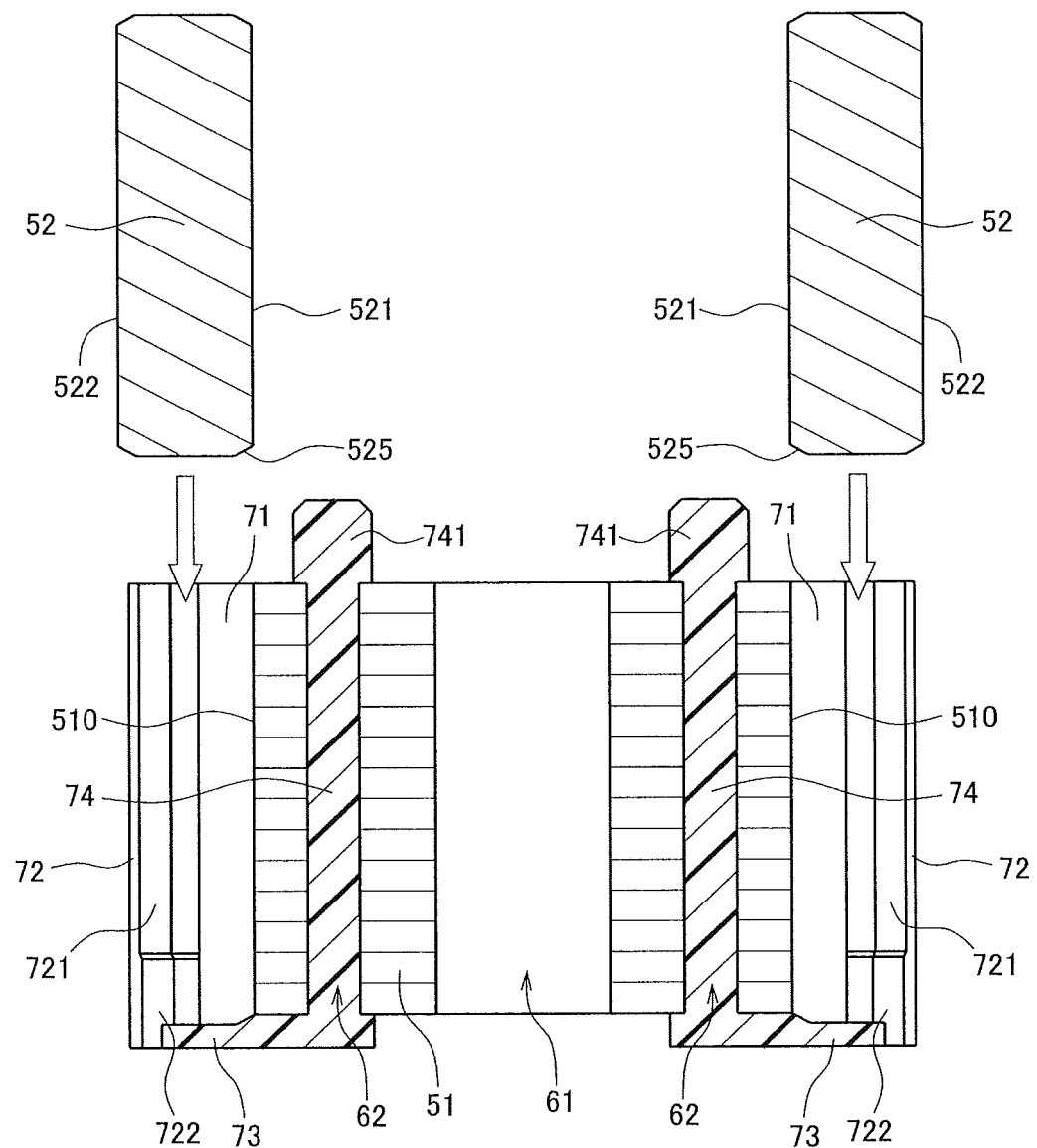
FIG. 8 is a vertical cross-sectional view at the time of manufacturing of the rotor unit according to the second embodiment.

FIG. 8 is a vertical cross-sectional view showing a state when press-fitting the magnet 52. As shown in FIGS. 7 and 8, the wall surface 721 has a convex portion 722 partially protruding toward the magnet 52. The magnet 52 press-fitted is subjected to especially intense pressure from the convex portion 722 of the wall surface 721 and is subjected to weaker pressure from another portion than from the convex portion 722 from another portion. In this way, a portion which is subjected to intense pressure due to press-fitting is limited to the vicinity of the convex portion 722. As a result, damage to the wall portion due to aging degradation or a change in temperature is suppressed. Further, the magnet 52 is more stably held between the rotor core 51 and the wall portion 72.

In this embodiment, the convex portion 722 is located in the vicinity of a lower end portion of the wall surface 721. However, the convex portion 722 may also be provided at another location of the wall surface 721. For example, the convex portion 722 may also be provided in the vicinity of the center in the axial direction of the wall surface 721.

The plurality of bosses 74 extend upward through the second through-holes 62 of the rotor core 51 from the upper surface of the bottom portion 73. Each of the bosses 74 has a top portion 741 protruding further upward than the upper surface of the rotor core 51. Further, the annular plate 54 is a substantially disk-shaped member having a hole at the center thereof. The upper surface of the rotor core 51 is in contact with the lower surface of the annular plate 54. Further, the upper surface of the magnet 52 comes into contact with the lower surface of the annular plate 54 or axially faces the lower surface of the annular plate 54 with a small gap interposed therebetween. An upward position shift of the plurality of magnets 52 is prevented by the annular plate 54. As a material of the annular plate 54, for example, resin or nonmagnetic metal is used.

Figure 9:
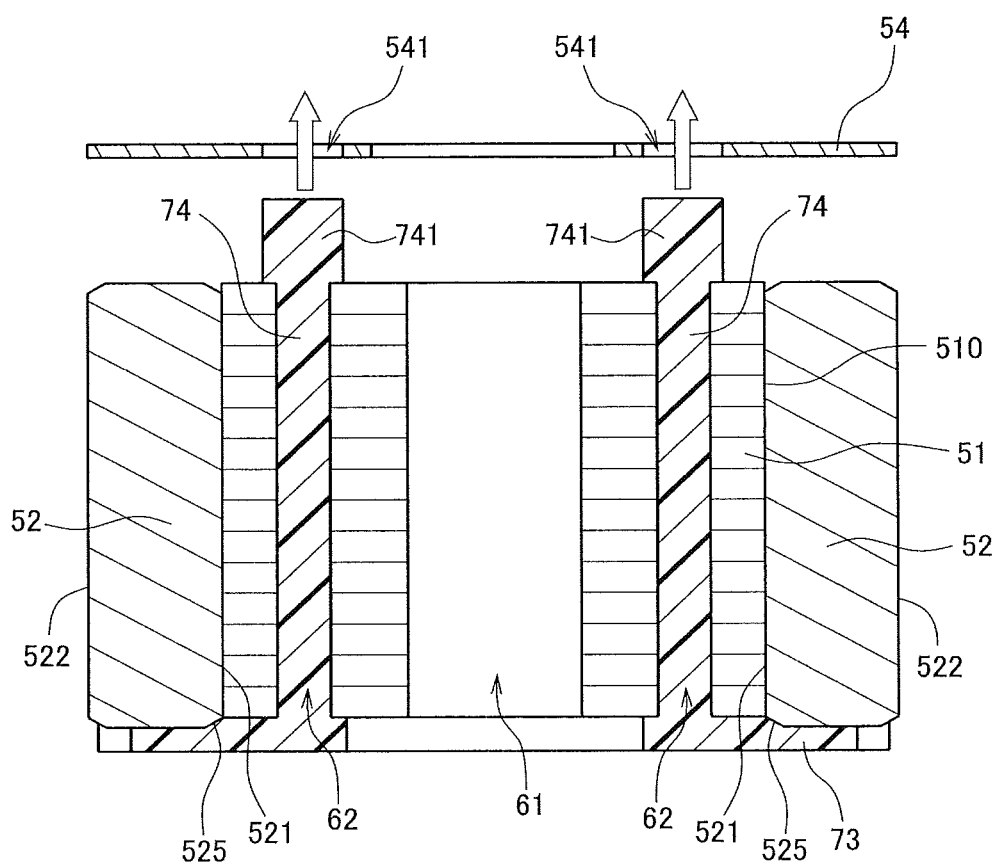
FIG. 9 is a vertical cross-sectional view at the time of manufacturing of the rotor unit according to the second embodiment.

FIG. 9 is a vertical cross-sectional view showing a state when mounting the annular plate 54. The annular plate 54 has a plurality of circular holes 541 around the hole provided at the center. As shown by outline arrows in FIG. 9, the top portions 741 are respectively inserted into the circular holes 541. Further, the top portion 741 protruding further upward than the annular plate 54 is welded to the upper surface of the annular plate 54 by heat or ultrasonic waves. As a result, as shown in FIG. 3, the annular plate 54 is fixed to the rotor core 51 and the magnet holder 53.

Figure 10:
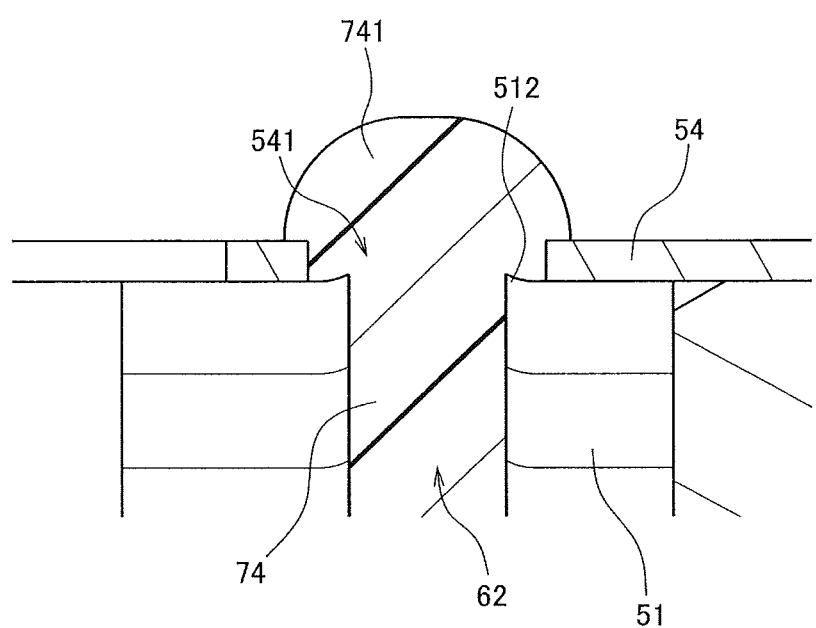
FIG. 10 is a partial vertical cross-sectional view of the rotor unit according to the second embodiment.

FIG. 10 is an enlarged vertical cross-sectional view of the vicinity of the top portion 741. As shown in FIG. 10, the rotor core 51 sometimes has a projection 512 in the vicinity of an upper end portion of the second through-hole 62. The projection 512 is formed during the punching of a steel sheet. If the lower surface of the annular plate 54 comes into contact with the projection 512, an inclination or a position shift of the annular plate 54 easily occurs. In this regard, in this embodiment, the outer diameter of the top portion 741 is made larger than the inner diameter of the second through-hole 62 of the rotor core 51. For this reason, the projection 512 of the rotor core 51 is molded into the top portion 741. In this way, the lower surface of the annular plate 54 does not come into contact with the projection 512. Therefore, the annular plate 54 can be more accurately disposed on the upper surface of the rotor core 51.

3. Modified Examples

The exemplary embodiments of the invention have been described above. However, the invention is not limited to the embodiments described above.

Figure 11:
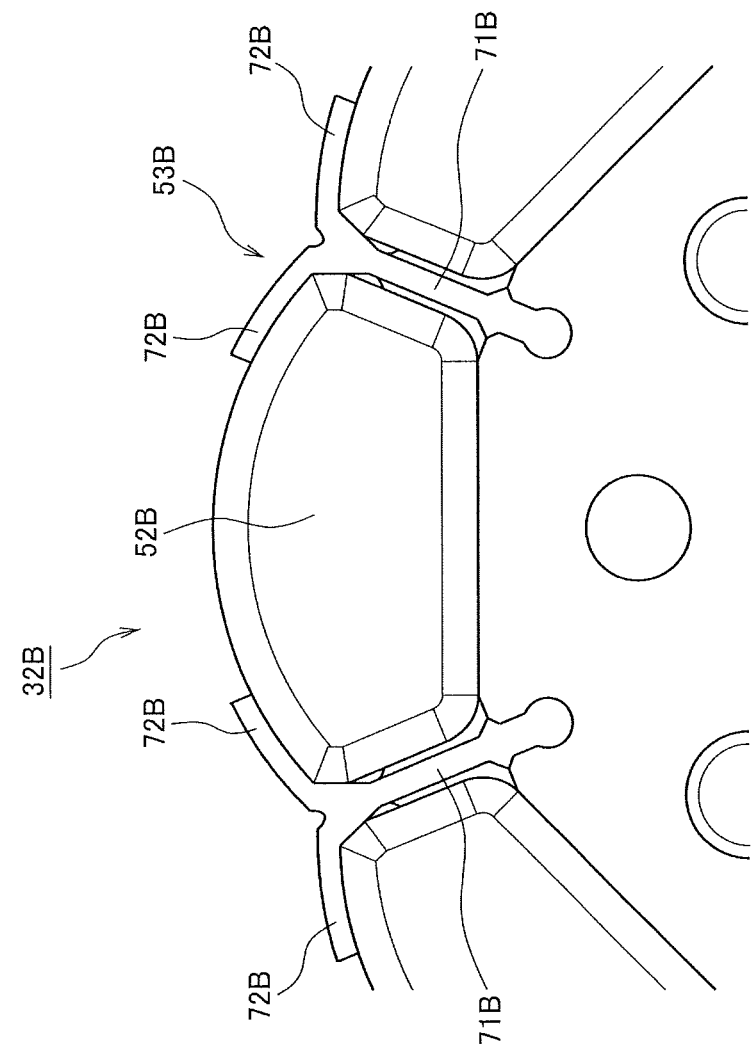
FIG. 11 is a partial top view of a rotor unit according to a modified example.

FIG. 11 is a partial top view of a rotor unit 32B according to a modified example. However, in FIG. 11, illustration of the annular plate is omitted. In this example, the radial thickness of a wall portion 72B of a magnet holder 53B is made to be substantially constant over a range from the vicinity of a columnar portion 71B to a leading end portion of the wall portion 72B. In this way, the flexibility of the vicinity of a base end portion of the wall portion 72B is improved further than that of the second embodiment described above. If the flexibility of the wall portion 72B is improved, a magnet 52B can be press-fitted more easily and stably. Further, since stress that is applied to the wall portion 72B is dispersed, damage to the wall portion 72B due to the press-fitting of the magnet 52B is also suppressed.

Figure 12:
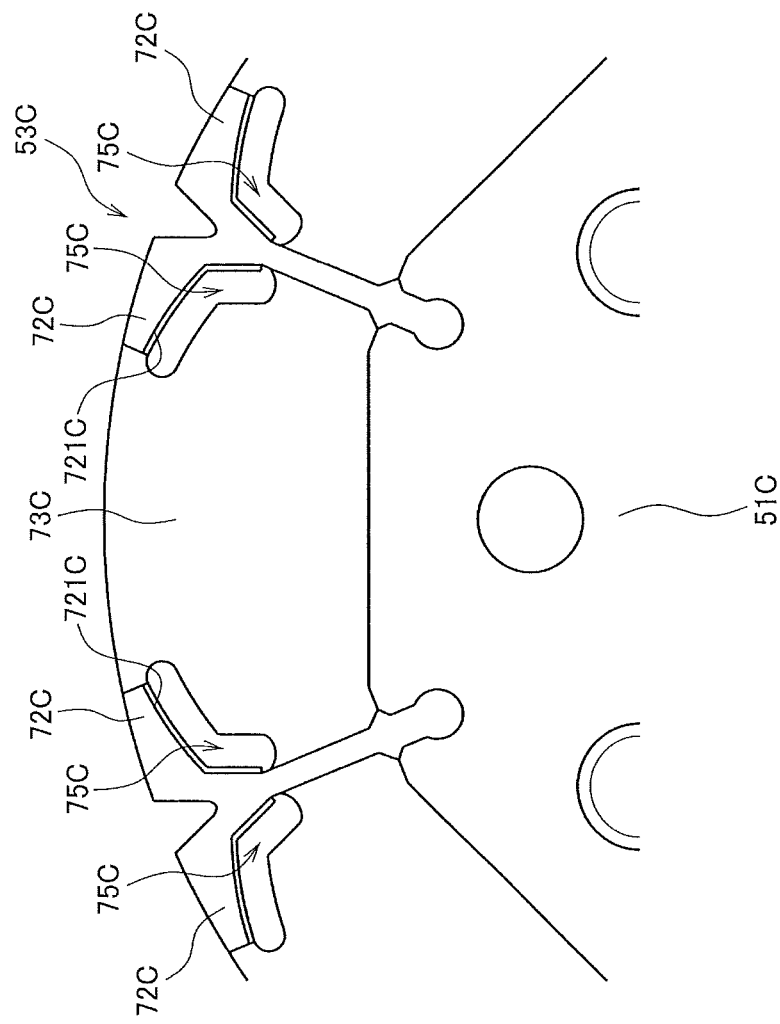
FIG. 12 is a partial top view of a rotor core and a magnet holder according to a modified example.

FIG. 12 is a partial top view of a rotor core 51C and a magnet holder 53C according to another modified example. In the example shown in FIG. 12, a concave portion 75C is formed in the upper surface of a bottom portion 73C of the magnet holder 53C. The concave portion 75C is located at a boundary portion between the bottom portion 73C and a lower end portion of a wall surface 721C. Even if the wall surface 721C is ground when press-fitting the magnet and thus dust is produced, the dust is accommodated in the concave portion 75C. Therefore, a position shift in the axial direction of the magnet due to dust can be suppressed.

Further, in the example shown in FIG. 12, a wall portion 72C and the bottom portion 73C of the magnet holder 53C are connected with the concave portion 75C interposed therebetween. For this reason, radially outward bending of the wall portion 72C is suppressed. Therefore, the press-fitting strength of the magnet in the vicinity of a lower end portion of the wall portion 72C can be improved.

The magnet may not be separated from the columnar portions at both end portions in the circumferential direction. For example, one of a pair of circumferential end faces of the magnet may also be in contact with the columnar portion of the magnet holder. If the number of magnets which come into contact with each columnar portion is less than or equal to 1, adjacent magnets' pushing each other with the columnar portion interposed therebetween can be avoided. Therefore, the circumferential end faces on at least one side of the magnet may face the columnar portion with a gap interposed therebetween in the circumferential direction.

The magnet may also be a ferrite magnet and may also be a neodymium magnet. However, in recent years, the price of a neodymium magnet including a rare earth has soared, and thus the use of the neodymium magnet has become difficult. On the other hand, in a case of using a sintered ferrite magnet, it is difficult to fabricate an annular magnet. For this reason, a technical demand to use a ferrite magnet and accurately arrange a plurality of ferrite magnets in the circumferential direction is high. In this regard, the invention is particularly useful.

The magnet holder may also be fabricated by insert molding, as described above, and may also be independently molded separately from the rotor core. Further, the number of columnar portions or the number of magnets may also be different from those in the embodiments described above. Further, a plurality of rotor units may also be mounted on the shaft of the motor.

Further, the motor according to the invention may also be a motor for a steering gear as described above and may also be a motor which is used in another part of an automobile. For example, the motor according to the invention may also be a motor for generating the driving force of an electric automobile. Further, the motor according to the invention may also be a motor which is used in an electric power-assisted bicycle, an electric motorcycle, home electric appliances, office automation equipment, medical equipment, or the like.

In addition, the shape of the details of each member may also be different from the shape shown in each drawing of this application. Further, the respective elements appearing in the embodiments or the modified examples described above may also be appropriately combined in a range in which inconsistency does not occur.

4. Another Invention that is Extracted from the Above-Described Embodiments

In addition, if a "prevention of an upward position shift of the magnet" is set as a first problem, the "columnar portion" or the "wall portion" is not essentially required. Further, alternatively, an invention which essentially requires the "annular plate" can be extracted from the embodiments described above. According to this invention, there is provided, for example, a "motor including: a stationary section; and a rotating section which rotates around a central axis extending vertically, wherein the stationary section includes a stator core having a plurality of teeth, and a coil constituted by a conducting wire wound around each of the teeth, the rotating section includes a plurality of magnets arranged in a circumferential direction in an area radially inner than the coil, a rotor core disposed radially inner than the magnets, a magnet holder which holds the magnets between the magnet holder and the rotor core, and an annular plate having a lower surface facing the upper surfaces of the magnets, the magnet holder has a top portion protruding further upward than the annular plate, and the top portion is welded to the upper surface of the annular plate".

According to this invention, an upward position shift of the magnet can be prevented by the annular plate. Further, the annular plate is rigidly fixed to the magnet holder. In addition, it is also possible to combine each element appearing in the above-described embodiments or modified examples with this invention.

FIELD OF INDUSTRIAL APPLICATION

The invention can be used in a motor. [Reference Signs List]

REFERENCE SIGNS LIST 1, 1A: motor
2, 2A: stationary section
3, 3A: rotating section
9, 9A: central axis
21: housing
22: lid
23: stator unit
24: lower bearing section
25: upper bearing section
31: shaft
32, 32B: rotor unit
41, 41A: stator core
42: insulator
43, 43A: coil
51, 51A, 51C: rotor core
52, 52A, 52B: magnet
53, 53A, 53B, 53C: magnet holder
54: annular plate
71, 71A, 71B: columnar portion
72, 72B, 72C: wall portion
73, 73C: bottom portion
74: boss
75: void 75C: concave portion
411: core back
412, 412A: teeth
510, 510A: outer peripheral surface
511: cutout
512: projection
522: convex curved surface
523, 523A: circumferential end face
524: inclined surface
525: chamfered portion
711: groove
721, 721A, 721C: wall surface
722: convex portion
741: top portion

The invention claimed is:

1. A motor, comprising:
a stationary section; and
a rotating section which rotates around a vertically extending central axis,
the stationary section including:
  a stator core having a plurality of teeth, and
  a coil constituted by a conducting wire wound around each of the plurality of teeth, the rotating section including:
  a plurality of magnets arranged in a circumferential direction in an area radially inner than the coil,
  a rotor core which comes into contact with the magnets,
  a magnet holder which is fixed to the rotor core, and
  an annular plate having a lower surface which faces an upper surface of the magnets,
wherein the annular plate is fixed to the rotor core and the magnet holder;
wherein the magnet holder has a top portion which protrudes further upward than the upper surface of the rotor core,
the top portion protruding further upward than the annular plate is fixed to the upper surface of the annular plate;
the top portion and the annular plate are separate members,
the annular plate is a plane,
only the upper surfaces of the plurality of magnets and the rotor core are in contact with the lower surface of the annular plate,
wherein the lower surfaces of the magnet and the rotor core are shifted in the axial direction,
wherein the magnet holder comprises a bottom portion proximate to a lower surface of the magnets; and
wherein the bottom portion comprises a first surface and a second surface, the second surface being displaced from the first surface in a direction of the central axis with a sloped portion provided between the first surface and the second surface.

2. The motor according to claim 1,
wherein the a bottom surface of the rotor core is in contact with the first surface of the bottom portion of the magnet holder;
bottom surfaces of the plurality of magnets are in contact with the second surface of the bottom portion of the magnet holder; and
the first surface is provided radially inward relative to the second surface.

* * * * *